US005955410A

United States Patent [19]

Dingess et al.

[11] Patent Number: 5,955,410

[45] Date of Patent: Sep. 21, 1999

[54] CLEANING COMPOSITIONS AND METHODS

[75] Inventors: John A. Dingess; Frank A. Osmanski, both of Hanover Park, Ill.

[73] Assignee: Safety-Kleen, Elgin, Ill.

[21] Appl. No.: 08/034,601

[22] Filed: Mar. 23, 1993

Related U.S. Application Data

[63] Continuation of application No. 07/781,664, Oct. 22, 1991, abandoned, which is a continuation of application No. 07/444,114, Nov. 30, 1989, abandoned, which is a continuation-in-part of application No. 07/322,523, Mar. 13, 1989, abandoned.

[51] Int. Cl.[6] .............................. C09D 9/00; C11D 9/00; C03C 23/00; C23G 1/02

[52] U.S. Cl. .......................... 510/202; 510/206; 510/417; 510/488; 510/499; 510/500; 510/506; 134/2; 134/3; 134/38; 134/40; 134/41

[58] Field of Search .............................. 252/DIG. 8, 541, 252/103, DIG. 14, 170, 364, 162; 510/202, 206, 417, 488, 499, 500, 506; 134/2, 3, 41, 40, 38

[56] References Cited

U.S. PATENT DOCUMENTS

| | | | |
|---|---|---|---|
| 3,960,742 | 6/1976 | Leonard | 252/90 |
| 4,120,810 | 10/1978 | Palmer | 252/171 |
| 4,242,218 | 12/1980 | Vander Mey | 252/143 |
| 4,428,871 | 1/1984 | Ward et al. | 252/DIG. 8 |
| 4,483,783 | 11/1984 | Albanese | 252/312 |
| 4,592,787 | 6/1986 | Johnson | 252/38 |
| 4,617,251 | 10/1986 | Sizensky | 252/162 |
| 4,627,931 | 12/1986 | Malik | 252/DIG. 14 |
| 4,732,695 | 3/1988 | Francisco | 252/162 |
| 4,749,510 | 6/1988 | Nelson | 252/166 |
| 4,765,844 | 8/1988 | Merrem et al. | 134/153 |
| 4,780,235 | 10/1988 | Jackson | 252/170 |
| 4,812,255 | 3/1989 | Suwala | 252/142 |
| 4,836,950 | 6/1989 | Madsen et al. | 252/153 |

*Primary Examiner*—Glenn Caldarola
*Attorney, Agent, or Firm*—Vedder, Price, Kaufman & Kammholz; James T. FitzGibbon

[57] ABSTRACT

Various cleaning compositions useful in cleaning oil and carbon residue encrusted metallic surfaces are described. The specific formulations of the present invention may include a variety of non-corrosive and non-hazardous materials which include an aliphatic ether of a propylene glycol and/or an ester thereof, an alkanolamine, an aliphatic fatty acid blend, an alkyl pyrrolidone, water and, in some applications, a mild caustic such as ammonium hydroxide, for example. The various formulations of the present invention combine their ability to dissolve or emulsify a combination of deposits commonly found on auto and aircraft engines and the like. These formulations are most effective in removing or dissolving soils, such as oils, greases, varnishes and like residue from oil, fuel, solvents and other sources. The particular formulations of the present invention are generally non-corrosive to metal surfaces, such as iron, steel, aluminum and aluminum alloys, die cast materials, such as zinc or zinc related materials or other miscellaneous non-ferrous materials, such as brass and bronze parts containing copper and tin, for example.

8 Claims, No Drawings

CLEANING COMPOSITIONS AND METHODS

This application is a continuation of application Ser. No. 07/781,664, filed Oct. 22, 1991 now abandoned, which is a continuation of Ser. No. 07/444,114 filed Nov. 30, 1989, now abandoned, which is a continuation-in-part of Ser. No. 07/322,523, filed Mar. 13, 1989, now abandoned.

BACKGROUND OF THE INVENTION

The present invention relates generally to cleaning compositions, and more particularly, to organic compositions of low toxicity which are useful in cleaning oil and carbon residue-encrusted metallic surfaces, such as those found on auto parts and the like.

In its most specific embodiments, the invention concerns particularized formulations having ingredients adapted to combine synergistically to provide improved ability to dissolve or emulsify the combination of deposits commonly found on auto, aircraft or other mechanical parts or components. These soils include raw or baked-on oils, greases, and the like; dirt of all kinds entrained therein, varnishes and like residues from oil, fuel, solvents and other sources, and refractory materials such as carbon or carbon-containing deposits which are strongly adhered to the parts in a form of tenacious, solid crusts. The carbon residues in question are usually those resulting from exposure to fuels and lubricants at extremely high temperatures, usually over a long period of time.

In order to be useful as cleaning composition for auto, aircraft and like parts, the compositions used must not be unduly corrosive to iron and ferrous alloys such as steel; aluminum and aluminum alloys of various kinds; die cast materials such as zinc or zinc-related materials; or other miscellaneous nonferrous materials, such as brass and bronze parts containing copper and tin, for example.

Prior art compositions used for cleaning auto parts are usually embodied in immersion cleaner solutions. Parts are placed in these solutions and allowed to soak, with or without agitation, for a period of time ranging from a number of minutes up to several hours, and sometimes overnight, for example. As a result of such soaking, various oily residues or the like are emulsified or pass into solution. After this, further residue removal may be undertaken by mechanical means, such as by brushing or scrubbing.

This immersion cleaner approach with room temperature soaking has been characterized in the prior art by the use of a mixture of aliphatic or aromatic solvents particularly, including chlorinated solvents and one or more phenol or cresol derivatives, in combination with one or more soaps or detergents having an oleophilic portion chemically resembling the oil and grease to which the parts have been exposed. Typical of such compositions are those previously marketed by the assignee of the present invention; these include, for example, major parts of methylene chloride, orthodichlorobenzene, cresylic acid and a petroleum sulfonate, with minor amounts of inhibitors and in some cases a complex amine. In such compositions, the oleophilic portion of the sulfonate dissolves in the oily residues and, upon washing with water, the residues are emulsified in the water and carried away. The combination of methylene chloride and the chlorinated aromatic solvents dissolve varnishes and other residues on the parts, while the phenol and phenol-related compositions are effective to remove carbon. This prior art approach has been quite successful for cleaning purposes, but has serious environmental drawbacks. As the risks of having such compositions become more fully appreciated, the risks are viewed with increasing apprehension by an environment-and health-concerned public.

From the foregoing, it will be noted that this kind of prior art immersion cleaner has been primarily concerned with using a mix of materials having plural, functional groups each suited to its intended purpose, and using different combinations to remove a variety of residue at room temperature. The immersion cleaner approach has also been taken in regard to cleaning nonferrous materials, such as carburetor parts. A similar approach has been taken with the composition wherein p-cresol and methylene chloride have formed the primary ingredients, with a tall oil fatty acid, and perhaps 2%–5% KOH being used, with or without a supplemental ionic or non-ionic detergent. These materials are suitable for cleaning materials such as the bowls, bases, and covers of most carburetors, but are not recommended for long exposure to brass parts in view of the caustic nature of the composition. Also, strong caustic compositions of any kind are not recommended for cleaning aluminum parts for obvious reasons.

Various military specification ("Mil-Spec") cleaners have also been specified which use a mixture of cresol, phenol, oleic acid, KOH, methylene chloride and a minor amount of a chelating agent such as EDTA (ethylenediamine tetraacetic acid). In the military specification compound known as Mil-C-19853C, 55% methylene chloride is used with 34% cresol, about 2% KOH, and 6%–7% oleic acid is present. Hence, the major part of the caustic is taken up in forming effective soaps. This product may be considered safe under some circumstances when used with aluminum and various aluminum alloys, clad aluminum products, steel, and magnesium with pickled surfaces. Reference is made to U.S. Government Printing Office Publication 1982-505-022/2671 for a further explication of this formula and its use.

Another military specification cleaning composition for carbon is identified as Mil-C-25107B (USAF). The chemical composition referred to in this reference is 53% by weight o-dichlorobenzene; 23% cresylic acid; a 10%–12% potassium oleate, with the composition containing not more than 10% of a mixture of water inhibitors and other materials.

The foregoing compositions typify materials used by formulators seeking to obtain a broad band cleaner which is effective on oily, greasy, and carbon-encrusted parts, but which will not damage the underlying parts themselves.

Certain other particular cleaning and solvent applications have called for the uses of different solvents for basically different but somewhat superficially related applications. These include the use of so-called dibasic ester solvents in connection with aromatic solvents and monoethanolamine and heterocyclic amines for paint strippers, for example. Some of these include using an aromatic solvent, a dibasic ester, N-methyl-2-pyrrolidone and with or without a minor part, such as 2% or less of monoethanolamine. These formulations are non-aqueous, water insoluble formulations used in stripping and solvent activity. However, these compositions are not water soluble or water dilutable.

Inasmuch as automobiles are making increasing uses of aluminum and other nonferrous materials, and bearing in mind that individual mechanics are not necessarily aware of the identities of various material which may be placed into contact with a cleaning solution, there is significant risk of damage to parts if an improper solvent or cleaning solution is selected. In this connection, merely by way of example, whereas cylinder heads on American automobiles in the past have been made almost exclusively from iron or steel alloys, aluminum cylinder heads using bronze valve guides are now in extremely common use; more and more accessory parts include aluminum or nonferrous alloy parts, while still other parts are made from specialty materials of various kinds. Hence, it is of paramount importance that cleaning solutions which are highly corrosive to these materials be avoided.

Another common prior art practice in cleaning carbon-encrusted and otherwise dirty materials has been the so-called hot tank method. This normally involves soaking parts for an extended period in a tank having a relatively high concentration of caustics such as KOH or NAOH, together with appropriate soaps and perhaps minor proportions of solvent. Articles such as engine blocks, for example, are often soaked for many hours in a tank filled with this kind of solution at temperatures ranging from 80° to 200° F. While this is highly effective for degreasing or related purposes, needless to say, aluminum and other nonferrous parts are totally intolerant of such treatment, and would be seriously damaged by even a very short exposure to such methods.

Reference has been made above to the recently discovered health hazards using a number of the materials identified above. In this connection, individual investigators, as well as government agencies, such as the Environmental Protection Agency (EPA) and others have now discovered that not only are many solvent compounds such as methylene chloride, relatively toxic to humans in high concentrations, but also that even low exposure may be harmful to users or to the environment over a period of time.

Moreover, other recent studies have shown that compounds previously believed to be relatively benign may have toxicities which have not been fully appreciated, or which may have been mistakenly believed to be of a lower level than is actually the case. In this connection, workers using these types of materials may often be doing so under conditions of restricted ventilation, or may be exposed to such products over a period of time which is longer than is now considered safe.

It has also been generally assumed that where a particular composition is of a certain toxicity, its analogs and homologs would have proportional if not equal toxicity. Consequently, the use of some compounds may not have been attempted because it was assumed that such compounds are also relatively toxic. As a consequence, some attempts have been made simply to use lower concentrations of effective cleaning materials, to better protect workers from contact with them, or to attempt to clean parts by mechanical methods.

None of these solutions is entirely satisfactory, and consequently, there has been a strong need for cleaning compositions which are effective to remove deposits of oily and greasy substances, varnishes, and encrusted materials such as baked-on carbon deposits, from the surfaces of a variety of substrates, including iron, steel, and various ferrous alloys; aluminum, brass, and other metals and alloys including magnesium, ferrous parts coated with chromium or cadmium, for example, and the like.

According to the present invention, it has been discovered that effective cleaning compositions may be made from a mixture of various ingredients which may include, in varying concentrations, certain glycol ethers (or esters derived from those ethers), aliphatic fatty acids such as oleic acid, amines, and alcohol amines, a minor portion of a very mild caustic such as ammonium hydroxide and water. Such compositions may include aromatic solvents such as cumene, or aliphatic solvents, with the aliphatic acids or the glycol ethers and their derivatives serving as couplers for the oil and water solvent and emulsion systems thereby created. The resulting composition is as effective or more effective than prior art compositions for cleaning oil and grease from automotive parts, and yet it provides greatly reduced short- and long-term exposure hazards.

It is accordingly an object of the present invention to provide a series of formulations for cleaning auto parts, which formulations present greatly reduced toxicity and health hazards.

Another object of the invention is to provide cleaning compositions for use in removing various kinds of soil from auto parts, and which are tolerant of a wide variety of materials from which such parts are made.

A further object of the invention is to provide a parts cleaning composition which contains materials which are not corrosive to the skin or hazardous to human health and which may be used as an immersion cleaner at room temperature.

A still further object of the invention is to provide cleaning compositions which use as a principal component one or more ethers or ether ester derivative compositions in combination with selected cyclic amines and alcoholic amines.

Yet another object of the invention is to provide a parts cleaning compound which is relatively safe for human use and which may include, in varying proportions and concentrations, propylene glycol methyl ether, propylene glycol monomethyl ether acetate, N-methyl pyrrolidone, ethanolamine, aliphatic acids and minor parts of ammonium hydroxide and water, with such composition being useful in auto parts cleaning.

Another object of the invention is to provide a composition of the type just described above which may further include a high boiling relatively nontoxic aromatic material.

A still further object of the invention is to provide a composition having a glycol ether or glycol ether acetate component in an amount of about 5% to about 80% by volume percent, a pyrrolidone or a cyclic amine in an amount of about 5% to about 35% by volume percent, and other materials in minor amounts.

The manner in which the foregoing and other advantages of the object are achieved in practice will become more clearly apparent when reference is made to the following examples of practicing the invention and the discussion set forth elsewhere herein.

DESCRIPTION OF THE PREFERRED EMBODIMENTS OF THE INVENTION

In order to obtain novel cleaning compositions for removing encrusted oil and carbon residues from metallic surfaces such aluminum, for example, a large class of formulations are contemplated herein which are environmentally safe, non-corrosive, relatively non-toxic and which have great utility as immersion cleaners at room temperature. This class of formulations generally may include measured amounts of aliphatic ethers of a propylene glycol either alone or in combination with esters thereof, one or more aliphatic acids, an alkanolamine, an alkyl pyrrolidone or cyclic amine and water.

As mentioned, the formulations of the present invention will include a propylene glycol based solvent which, preferably, is in the form of a propylene glycol aliphatic ether or an acetate thereof. Most preferably, the propylene glycol based solvent will be in the form of a propylene glycol tertiary-butyl ether, a propylene glycol tertiary-butyl acetate, a propylene glyclo methyl ether, or a propylene glycol methly ether acetate.

Regarding the alkyl pyrrolidone, N-methyl-2 pyrrolidone has been found to be quite satisfactory in removing varnish and carbon deposits from dirty engine parts, such as aluminum automobile pistons, for example. It is further noted that the N-methyl-2-pyrrolidone, when combined with a propylene glycol based solvent, such as those described above, displays an enhanced cleaning or residue dissolving ability which is generally utilized in the disclosed compositions of the present invention. The above mentioned propylene glycol based solvents are generally useful for their grease dissolving ability. However, when combined with the N-methyl-2-pyrrolidone, an apparent synergistic effect is noted in that the propylene glycol based solvent in combination with the pyrrolidone, displays an improved grease and varnish removing ability.

Regarding the alkanolamine, an ethanolamine is preferred. Most preferably, monoethanolamine in an amount less than about 10% by volume, has proven to be an efficient and desirable varnish and carbon residue solvent. In a water soluble system, ammonium hydroxide may also be used as a mild caustic which, in the formulations of the present invention, has proven to be an efficient and effective carbon remover when present in low volume percentages.

One or more aliphatic fatty acids may be included in formulations of the present invention. In this regard, commercially available blends of aliphatic fatty acids are preferred wherein the acids in such blends have a carbon chain length from about $C_{14}$ to $C_{18}$. Those blends having a relatively high concentration of oleic acid are more preferred and those fatty acid blends having a concentration of oleic acid above about 60% by volume are most preferred. As used herein, the term "aliphatic acid blend" shall be understood to include those blends having an oleic acid concentration above 60% by volume. These acids, in an oil soluble system, will form a soap with a compatable amount of an alkanolamine such as monoethanolamine, for example. A commercially available aliphatic acid blend known under the trade name INDUSTRENE 105 has been suitable for formulations of the present invention. A typical formulation, according to the invention, will contain less than about 20% by volume of an aliphatic acid blend, such as INDUSTRENE 105, with less than about 15% by volume of alkanolamine along with various other components, as discussed below.

It should be noted that the propylene glycol based solvent discussed above includes various homologues of the above discussed propylene glycol compounds. For example, dipropylene glycol aliphatic ethers, tripropylene glycol aliphatic ethers, and the acetates thereof may be included within the formulations of the present invention. As used herein, the term "propylene glycol based solvent" shall be understood to include these homologues.

While the invention may be embodied in a wide variety of compositions, a series of working examples are set forth and further discussed below.

EXAMPLE 1

A composition having the following formulation was prepared:

| Component | Volume percent |
|---|---|
| Propylene glycol monomethyl ether acetate | 64 |
| N-methyl-2 pyrrolidone (NMP) | 24 |
| Monoethanolamine (MEA) | 5 |
| Water | 5 |
| Ammonium hydroxide | 2 |

Dirty engine parts were prepared from used aluminum automobile pistons. The pistons were immersed in the composition and were gently agitated. Following a 15 minute soak, the pistons were removed from the solution and flushed with water. Loosened soil was brushed off the parts and the procedure was repeated a second time. In this manner, the formulation degreased and removed the carbon deposits from the engine parts as well or better than a typical prior art carburetor cleaner.

EXAMPLE 2

A composition having the following formulation was prepared:

| Component | Volume percent |
|---|---|
| Propylene Glycol t-Butyl Ether (PTB) | 44.3 |
| Cumene (Isopropyl Benzene) | 18.7 |
| Dipropylene Glycol Methyl Ether (DPM) | 6.4 |
| N-Methyl-2-Pyrrolidone (NMP) | 16.5 |
| Monoethanolamine (MEA) | 4.7 |
| Water | 9.4 |

As in example 1, dirty engine parts were immersed in the above formulation for a period of approximately 15 minutes with gentle agitation. Following rinsing, the immersion was repeated which resulted in degreasing and carbon removal in a manner which is equivalent to or better than a typical prior art carburetor cleaner.

EXAMPLE 3

A composition having the following formulation was prepared.

| Component | Volume percent |
|---|---|
| Propylene Glycol t-Butyl Ether (PTB) | 43.1 |
| Aromatic 150 | 18.2 |
| Dipropylene Glycol Methyl Ether (DPM) | 9.1 |
| N-Methyl-2-Pyrrolidone (NMP) | 16.0 |
| Monoethanolamine (MEA) | 4.5 |
| Water | 9.1 |

As in example 1, dirty engine parts were immersed in the above formulation for a period of approximately 15 minutes with gentle agitation. Following rinsing, the immersion was repeated which resulted in degreasing and carbon removal in a manner which is equivalent to or better than a typical prior art carburetor cleaner.

EXAMPLE 4

Another formulation is prepared as follows:

| Component | Volume percent |
|---|---|
| PTB | 46 |
| Aromatic 150 | 23 |
| DPM | 4 |
| NMP | 15 |
| MEA | 4 |
| Water | 8 |

EXAMPLE 5

Another formulation is prepared as follows:

| Component | Volume percent |
|---|---|
| PTB | 35 |
| Aromatic 150 | 5 |
| DPM | 13 |
| NMP | 14 |
| MEA | 5 |
| Water | 9 |

EXAMPLE 6

Another formulation is prepared as follows:

| Component | Volume percent |
|---|---|
| PTB | 40 |
| Isopar | 12 |
| DPM | 7 |
| NMP | 16 |
| MEA | 6 |
| Water | 8 |

EXAMPLE 7

Another formulation is prepared as follows:

| Component | Volume percent |
|---|---|
| PTB | 32 |
| Cumene | 18 |
| DPM | 4 |
| Propylene Glycol Methyl Ether Acetate | 16 |
| NMP | 16 |
| MEA | 5 |
| Water | 9 |

EXAMPLE 8

Another formulation is prepared as follows:

| Component | Volume percent |
|---|---|
| PTB | 27 |
| Isopar | 18 |
| DPM | 20 |
| NMP | 20 |
| MEA | 5 |
| Water | 10 |

EXAMPLE 9

A composition having the following formulation was prepared:

| Component | Volume percent |
|---|---|
| Aromatic 200 | 52.2 |
| DPM | 10.0 |
| NMP | 16.0 |
| MEA | 4.8 |
| Water | 9.0 |
| INDUSTRENE 105 | 8.0 |

Dirty Carburetor parts were immersed in the composition and gently agitated. The parts were then removed from the solution and flushed with water. In this manner, the formulation degreased and removed the deposits from the carburetor parts as well as or better than a typical prior art carburetor cleaner.

EXAMPLE 10

Another formulation is prepared as follows:

| Component | Volume percent |
|---|---|
| Cumene | 30 |
| DPM | 6 |
| NMP | 30 |
| MEA | 10 |
| Water | 9 |
| Aliphatic Acids | 15 |

EXAMPLE 11

Another formulation is prepared as follows:

| Component | Volume percent |
|---|---|
| Aromatic 150 | 30 |
| Aromatic 100 | 30 |
| DPM | 8 |
| NMP | 20 |
| MEA | 3 |
| Water | 4 |
| Aliphatic Acids | 5 |

EXAMPLE 12

Another formulation is prepared as follows:

| Component | Volume percent |
|---|---|
| Aromatic 150 | 40 |
| Aromatic 200 | 10 |
| DPM | 20 |
| NMP | 10 |
| MEA | 6 |
| Water | 14 |
| Aliphatic Acid | 10 |

As is generally illustrated in the above examples one through twelve, the principal ingredients of the formulations of the present invention may be provided at various percentages within widely defined ranges of effectiveness. Preferably, the present invention will include between about 5% to about 80% by volume of a propylene glycol aliphatic ether and/or an ester thereof. Additionally, a cyclic amine or an alkyl pyrrolidone, such as N-methyl-2-pyrrolidone is present in an amount between about 5% to about 35% by volume and an alkanolamine, such as ethanolamine, is present in an amount between about 1% by volume to about 12% by volume. An aliphatic fatty acid blend may be present in an amount between about 2% and about 20% by volume. Water is also added.

While the present invention is not intended to be limited to any particular theory or system of operation, it is believed that the different components serve certain primary functions as well as secondary functions in the use of the composition. For example, the principal solvent component is generally a propylene glycol aliphatic ether. The propylene glycol used in the formulations of the present invention are of greatly reduced toxicity relative to their ethylene glycol homologues, for example. These propylene glycol compositions used herein are believed to metabolize in humans by a mechanism different than their ethylene glycol homologues so that these propylene glycols are many times less toxic than their ethylene glycol counterparts.

The water solubility of some of the various principal ingredients contained in the formulations encompassed by the present invention differ slightly but many of these ingredients are essentially highly water soluble or water dispersible. The aliphatic fatty acid blend is, of course, essentially non-soluble in water and finds particular use in those formulations where organic or aromatic solubility is required, as is further discussed below. Regarding the propylene glycol solvents used herein, the hydroxyl group in the propylene glycol aliphatic ether may be esterified with acetic acid to create the methyl ether acetate derivative, such as propylene glycol methyl ether acetate.

In applications where enhanced organic or aromatic solubility is necessary or desired, a propylene glycol tertiary-butyl ether may be substituted for a propylene glycol methyl ether. This t-butyl composition is similar to a propylene glycol methyl ether except that the t-butyl composition is much more oil soluble. Consequently, when the two ethers are used together, this combination of propylene glycol solvents provides solubility for both aromatic and non-aromatic compounds by providing a coupling action whereby oil, water and the other materials of the various formulations act in concert and remain in a single phase over a relatively wide range of concentrations. In addition to the coupling action thus provided, reclamation or recycling of the constituents is made easier by using this combination of ingredients.

Furthermore, the propylene glycol methyl ether may also be combined with the aliphatic acid blend in a high-boiling aromatic solvent and in the absence of the aforementioned t-butyl ether. Such a formulation is also contemplated within the general parameters of the invention in applications similar to those wherein the t-butyl ether could be employed such as where organic solubility is needed, for example. When so employed, the aliphatic acid blend forms a soap with excess alkanolamine in a single phase cleaning system.

The monoethanolamine used herein, is very effective in removing carbon and is a very effective, relatively non-toxic replacement for the effective, but highly toxic methylene chloride used in the mil.-spec compounds and other carbon removing compounds referred to above.

It may be desired to use a relatively larger portion of aromatic solvents or aliphatic solvents or a mixture thereof, depending on the type of oil or grease to be dissolved or emulsified. In this connection, the relative proportions of the propylene glycol t-butyl ether solvent and the propylene glycol methyl ether solvent may be altered to achieve the desired combination of solubilities. For example, the t-butyl ether variety provides a higher degree of solubility in aromatic solvents for the various other components while also providing for enhanced oil solubility within the formulations. A similar enhanced oil solubility may be achieved with the aliphatic acid blend and a high purity high boiling commercial aromatic solvent having a flash point of between about 40° C. (104° F.) and about 105° C. (221° F.) such as those known under the trade names Aromatic 150, Aromatic 100, and Aromatic 200, for example. Aromatic 150 is known to have a flash point of about 66° C. (150° F.). Aromatic 100 has a flash point of about 42° C. (108° F.) and Aromatic 200 has a flash point of about 103° C. (217° F.) with a boiling range of about 226° C. to 279° C. (439–535° F.). All three of the above-mentioned solvents contain about 98% aromatics and can be obtained from Exxon Corporation. Cumene and other high boiling aromatics may also be used such as that known under the trade name Han 857, a solvent with a boiling range of about 182° C. to about 277° C. (360–530° F.), also available from Exxon Corporation. These commerical solvents may also enhance the oil solubilities of formulations made without aliphatic acids. Suitable aliphatic solvents include various mixtures of mid-range boiling point aliphatics. Suitable commercially available solvents include those containing isoparaffinic materials of suitable high purity such as the solvent known under the trade name ISOPAR, for example.

The alkyl-pyrrolidone constituent, preferably N-methyl-2-pyrrolidone, is very effective as a varnish remover and is made compatible with the other constituents in the proportions indicated. In the formulations of the present invention, the pyrrolidone constituent is believed to achieve an enhanced varnish removing or cleaning ability when combined with a propylene glycol aliphatic ether compound, including an acetate thereof. Such combinations of N-methyl-2-pyrrolidone and a propylene glycol solvent are utilized in the various formulations of the present invention.

The alkanolamine component of the present invention is preferably an ethanolamine and, most preferably, monoethanolamine. Monoethanolamine is an extremely effective solvent for varnish and the type of baked on carbon residue which is typical of various parts of internal combustion engines following substantial and continuous use under normal as well as extreme operating conditions. In the appropriate proportions, monoethanolamine will form an effective soap with one or more aliphatic acid in a single phase cleaning system in formulations having enhanced organic aromatic solubility.

Those skilled in the art will appreciate that the various formulations of the present invention represent a substantial advance over the various prior art formulations for removing carbon and other residue from used engine parts. While various prior art formulations contain chlorinated solvents such as methylene chloride, trichloroethylene, and ortho-dichlorobenzene, the present invention does not require inclusion of such chlorinated solvents. In this manner, the adverse environmental impact inherent in the use of such chlorinated substances is substantially avoided. Additionally, by avoiding the use of such compounds, the formulations of the present invention are substantially non-toxic when compared with various prior art cleaning compositions.

Additionally, by avoiding the use of hot (or boiling) aqeuous caustic mixtures, the formulations of the present invention may be used with various aluminum alloys without damage thereto. Furthermore, the corrosive characteristics of such caustic mixtures has always been a danger to those using such formulations. By use of the present invention, the dangers of corrosive damage as well as other inherent health hazards are avoided.

Generally, the cleaning compositions of the present invention contain no chlorinated solvents. The alkanolamine is used to remove varnish and carbon deposits from various engine parts and will combine with aliphatic fatty acids, when present, to form a soap. Ammonium hydroxide may be used in combination with the alkanolamine to further enhance carbon removal. The propylene glycol ether, or an ester thereof, combined with an alkylpyrrolidone, is included as a degreasing substitute for methylene chloride. In the formulations disclosed and described herein, the present invention is generally less volatile and less of a health threat than the various cleaning compositions of the prior art containing methylene chloride and/or hot aqueous caustic mixtures.

While various preferred embodiments of the present invention have been discussed and described herein, it will be understood by those skilled in the art that further modifications and changes are contemplated and may be made within the principals of the present invention without departing from the true spirit and scope thereof, as defined in the following claims.

We claim:

1. A composition for removing encrusted residues from metallic surfaces and including, in combination, solvents for dissolving various organic deposits, the composition consisting essentially of: between about 5% and about 20% by volume of a propylene glycol based solvent consisting of a propylene glycol methyl ether, a propylene glycol methyl ether acetate or combinations thereof; between about 10% and about 30% by volume of N-methylpyrrolidone; between about 1% and about 10% by volume of monoethanolamine; between about 1% and about 20% by volume of water; between about 5% and about 15% by volume of a fatty acid blend, said fatty acid blend including at least about 60% by volume of acid; and between about 10% and about 70% by volume of a high boiling aromatic hydrocarbon solvent having a flash point of between about 40° C. and about 105° C.

2. A composition for removing encrusted residues from metallic surfaces and including, in combination, solvents for dissolving various organic deposits, the composition consisting essentially of: about 10% by volume of dipropylene glycol methyl ether, dipropylene glycol methyl ether acetate or combinations thereof; about 16% by volume of N-methylpyrrolidone; about 5.0% by volume of monoethanolamine; between about 7% and about 9% by volume of water; between about 8% and about 10% by volume of an aliphatic fatty acid blend; and the remainder a high boiling aromatic hydrocarbon solvent having a flash point of between about 40° C. about 105° C.

3. The composition as defined in claim 2 wherein said aliphatic fatty acid blend includes at least about 80% by volume of oleic acid.

4. The composition as defined in claim 1 wherein said propylene glycol based solvent is about 10% by volume, said N-methyl pyrrolidone is about 16% by volume and said monoethanolamine is between about 4% and about 5%.

5. The composition as defined in claim 4 wherein said propylene glycol based solvent is dipropylene glycol methyl ether, dipropylene glycol methyl ether acetate or combinations thereof.

6. A method for removing encrusted residues from metallic surfaces, said method comprising: formulating a cleaning solvent composition capable of dissolving organic deposits, the cleaning solvent composition consisting essentially of about 10% by volume of dipropylene glycol methyl ether, dipropylene glycol methyl ether acetate or combinations thereof; about 16% by volume of N-methyl pyrrolidone; about 5% by volume of monoethanolamine; between about 7% and about 9% by volume of water; between about 8% and about 10% by volume of an aliphatic fatty acid blend; and the remainder a high boiling aromatic hydrocarbon solvent having a flash point of between about 40° C. and about 105° C. and immersing said metallic surfaces in said solvent composition for a period of time effective to remove said residues.

7. The method of claim 6 wherein said formulating step includes formulating said cleaning composition with said aliphatic fatty acid blend wherein said blend includes at least about 80% by volume of oleic acid.

8. The method as defined in claim 6 wherein said predetermined period of time is at least about 15 minutes.

* * * * *